United States Patent
Turnbull

(10) Patent No.: US 6,552,326 B2
(45) Date of Patent: *Apr. 22, 2003

(54) LOW EMI MULTIPLEXED DUAL DISPLAY

(75) Inventor: Robert R. Turnbull, Buchanan, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/036,627

(22) Filed: Dec. 31, 2001

(65) Prior Publication Data

US 2002/0057267 A1 May 16, 2002

Related U.S. Application Data

(63) Continuation of application No. 09/359,616, filed on Jul. 22, 1999, now Pat. No. 6,346,698.

(51) Int. Cl.[7] .................................................. H01J 40/14
(52) U.S. Cl. ........................... 250/214 D; 250/214 AL; 359/229
(58) Field of Search ................................. 250/205, 216, 250/201.1, 214 D, 214 AL; 359/230, 229, 242–244, 265, 267

(56) References Cited

U.S. PATENT DOCUMENTS

| | | |
|---|---|---|
| 4,672,457 A | 6/1987 | Hyatt |
| 5,285,060 A | 2/1994 | Larson et al. |
| 5,455,716 A | 10/1995 | Suman et al. |
| 5,631,638 A | 5/1997 | Kaspar et al. |
| 5,650,929 A | 7/1997 | Potter et al. |
| 5,661,455 A | 8/1997 | Van Lente et al. |
| 5,687,939 A | 11/1997 | Moscovitch |
| 5,691,848 A | 11/1997 | Van Lente et al. |
| 5,699,044 A | 12/1997 | Van Lente et al. |
| 5,708,415 A | 1/1998 | Van Lente et al. |
| 5,731,790 A * | 3/1998 | Riza ........................... 342/368 |
| 5,786,772 A | 7/1998 | Schofield et al. |
| 5,883,605 A | 3/1999 | Knapp |
| 5,898,392 A | 4/1999 | Bambini et al. |
| 6,229,226 B1 | 5/2001 | Kramer et al. |
| 6,236,158 B1 | 5/2001 | Kikuchi |
| 6,262,831 B1 | 7/2001 | Bauer et al. |
| 6,346,698 B1 * | 2/2002 | Turnbull ................. 250/214 R |

OTHER PUBLICATIONS

Mirror, Speak to Me, Popular Science, Apr. 1998, p. 15.
Autolink Rear–View Mirror, AI, Feb. 1998, p. 157.
Newaves, 2. Johnson Controls and Highway Master Corp. rearview mirror; Blow–up of item 2, Mar. 1998, (2 pages).

* cited by examiner

Primary Examiner—Que T. Le
(74) Attorney, Agent, or Firm—Price Heneveld Cooper DeWitt & Litton

(57) ABSTRACT

A mirror assembly having an electrically adjustably reflectivity provides for the simultaneous display of a vehicle heading and an external temperature. The mirror assembly includes a reflective device, a dual display and a control circuit. The reflective device includes a transmissive element and a reflective surface formed on the transmissive element. The dual display is located behind the reflective surface of the reflective device. The dual display visually provides the vehicle heading and the external temperature through the reflective device. The control circuit provides for the variable attenuation of light through the transmissive element of the reflective device and controls the intensity and information displayed by the dual display. An advantage of the present invention is that it provides a dual display while exhibiting currently acceptable electromagnetic interference levels.

27 Claims, 7 Drawing Sheets

LOW EMI MULTIPLEXED DUAL DISPLAY

CROSS-REFERENCE TO RELATED APPLICATIONS

This application is a continuation of U.S. patent application Ser. No. 09/359,616 (now U.S. Pat. No. 6,346,698), to Robert R. Turnbull, entitled "LOW EMI MULTIPLEXED DUAL DISPLAY," filed Jul. 22, 1999, now U.S. Pat. No. 6,346,698, the entire disclosure of which is hereby incorporated herein by reference.

BACKGROUND OF THE INVENTION

The invention generally relates to a mirror assembly having an electrically adjustable reflectivity, and more specifically to a mirror assembly that provides for the simultaneous display of a vehicle heading and an external temperature.

Mirror systems are known in the art that include a reflective element having a transmissive element of variable transmittance and a reflective surface disposed behind the transmissive element. Those mirror systems have used a drive signal coupled to the transmissive element of the mirror system so as to variably attenuate the reflectance of the mirror system. Typically, the transmissive element has included an electrochromic element. Examples of such mirror systems are disclosed in U.S. Pat. No. 4,902,108, entitled "SINGLE-COMPARTMENT, SELF-ERASING, SOLUTION-PHASE ELECTROCHROMIC DEVICES SOLUTIONS FOR USE THEREIN, AND USES THEREOF," issued Feb. 20, 1990, to H. J. Byker; Canadian Patent No. 1,300,945, entitled "AUTOMATIC REARVIEW MIRROR SYSTEM FOR AUTOMOTIVE VEHICLES," issued May 19, 1992, to J. H. Bechtel et al.; U.S. Pat. No. 5,128,799, entitled "VARIABLE REFLECTANCE MOTOR VEHICLE MIRROR," issued Jul. 7, 1992, to H. J. Byker; U.S. Pat. No. 5,202,787, entitled "ELECTRO-OPTIC DEVICE," issued Apr. 13, 1993, to H. J. Byker et al.; U.S. Pat. No. 5,204,778, entitled "CONTROL SYSTEM FOR AUTOMATIC REARVIEW MIRRORS," issued Apr. 20, 1993, to J. H. Bechtel; U.S. Pat. No. 5,278,693, entitled "TINTED SOLUTION-PHASE ELECTROCHROMIC MIRRORS," issued Jan. 11, 1994, to D. A. Theiste et al.; U.S. Pat. No. 5,280,380, entitled "UV-STABILIZED COMPOSITIONS AND METHODS," issued Jan. 18, 1994, to H. J. Byker; U.S. Pat. No. 5,282,077, entitled "VARIABLE REFLECTANCE MIRROR," issued Jan. 25, 1994, to H. J. Byker; U.S. Pat. No. 5,294,376, entitled "BIPYRIDINIUM SALT SOLUTIONS," issued Mar. 15, 1994, to H. J. Byker; U.S. Pat. No. 5,336,448, entitled "ELECTROCHROMIC DEVICES WITH BIPYRIDINIUM SALT SOLUTIONS," issued Aug. 9, 1994, to H. J. Byker; U.S. Pat. No. 5,434,407, entitled "AUTOMATIC REARVIEW MIRROR INCORPORATING LIGHT PIPE," issued Jan. 18, 1995, to F. T. Bauer et al.; U.S. Pat. No. 5,448,397, entitled "OUTSIDE AUTOMATIC REARVIEW MIRROR FOR AUTOMOTIVE VEHICLES," issued Sep. 5, 1995, to W. L. Tonar; and U.S. Pat. No. 5,451,822, entitled "ELECTRONIC CONTROL SYSTEM," issued Sep. 19, 1995, to J. H. Bechtel et al. Each of these patents is commonly assigned with the present invention and the disclosures of each, including the references contained therein, are hereby incorporated herein in their entirety by reference.

Optical display devices have also been provided behind the reflective element of such mirror systems in order to produce a single visual display of various information. Those optical display devices have typically been adapted to be viewed through the mirror system and have displayed various information which has included a vehicle direction, a time, or a temperature.

Various types of optical display devices have been utilized with mirror systems. For example, the optical display device could be an electroluminescent device, a vacuum fluorescent display, a light emitting diode (LED), semiconductor laser, incandescent, back-lit crystal display, cathode ray tube, or any number of other display technologies. In addition, multiple display devices have been implemented in the bezel of prior art rearview mirror assemblies.

While mirror systems have been disclosed in literature as having displays on which a wide variety of information is simultaneously displayed, such mirror systems have not been commercially practical due to their high levels of electromagnetic interference (EMI) or high cost. Auto manufacturers have imposed relatively strict limits on the EMI levels exhibited by interior rearview mirrors due to their close proximity to the radio antenna and other sensitive electronic equipment in the vehicle's instrument panel. Currently, the EMI levels for a rearview mirror must typically be less than the limits in FIG. 7. Thus, mirror systems that have been commercially implemented have typically displayed only the vehicle heading or the external temperature at one time or use a non-multiplexed display which increases size and cost, so as to keep the EMI levels within acceptable limits.

SUMMARY OF THE INVENTION

An embodiment of the present invention is directed to a mirror assembly having an electrically adjustably reflectivity. The mirror assembly provides for the simultaneous display of a vehicle heading and an external temperature. The mirror assembly includes a reflective device, a dual display and a control circuit. The reflective device includes a transmissive element and a reflective surface formed on the transmissive element. The dual display is located behind the reflective surface of the reflective device. The dual display visually provides the vehicle heading and the external temperature through the reflective device. The control circuit provides for the variable attenuation of light through the transmissive element of the reflective device and controls the intensity and information displayed by the dual display. An advantage of the present invention is that it provides a dual display while exhibiting an electromagnetic interference level within acceptable limits. In addition, a single display driver is utilized to update the dual display such that the expense of using two display drivers is avoided.

These and other features, advantages and objects of the present invention will be further understood and appreciated by those skilled in the art by reference to the following specification, claims and appended drawings.

DETAILED DESCRIPTION OF PREFERRED EMBODIMENT

A mirror assembly with an electrically adjustable reflectivity that provides for the simultaneous display of a vehicle heading and an external temperature is further described below.

The mirror assembly includes a reflective device that includes a transmissive element and a reflective surface as is well known in the art. The dual display is located behind the reflective surface of the reflective device. The dual display provides the vehicle heading and the external temperature through the reflective device. The control circuit provides for the variable attenuation of light through the transmissive element and controls the intensity and information displayed by the dual display. The disclosed embodiment of the present invention exhibits an electromagnetic interference level less than the levels in FIG. 7, while simultaneously providing a visual indication of both an external temperature and a vehicle heading.

Figure 1:
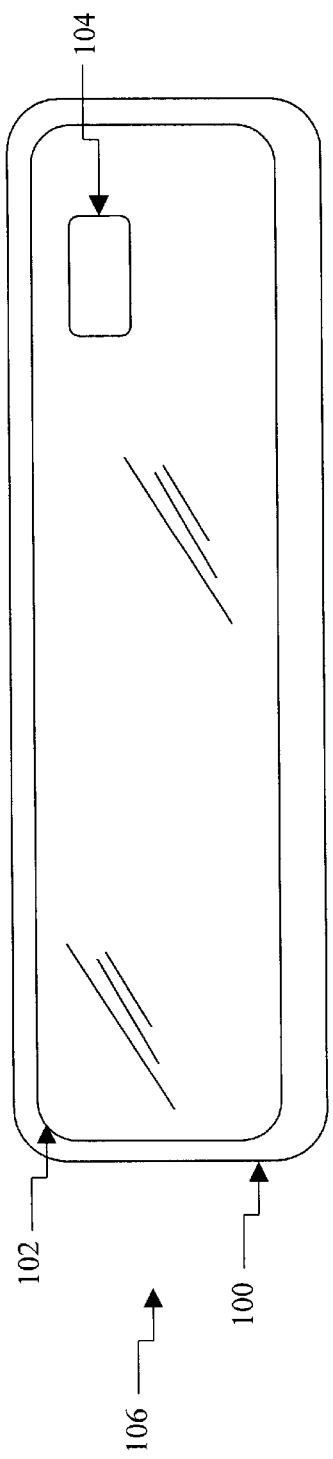
FIG. 1 is a perspective view of the front of a rearview mirror assembly constructed in accordance with the present invention.

Turning to FIG. 1, illustrated is a rearview mirror system 106 incorporating a mirror assembly 102 of the present invention. Mirror assembly 102 is adapted to be contained in a housing 100. A dual display (not shown in FIG. 1) is adapted to be mounted within rearview mirror system 106 such that the dual display is visible through a window 104 provided in a reflective surface of mirror assembly 102. Window 104 may be formed by completely removing or partially removing reflective material on the reflective surface as is further depicted in FIG. 2. Alternatively, window 104 may be provided by forming a partially transmissive or partially reflective area in the reflective surface. As yet another alternative, the entire reflective surface could be partially reflective and partially transmissive such that no "window" need be provided and the display could be positioned anywhere behind the mirror. Examples of electrochromic mirror systems having partially transmissive reflective surfaces are disclosed in commonly-assigned U.S. patent application Ser. No. 09/311,955 (now U.S. Pat. No. 6,356,376), entitled "ELECTROCHROMIC REARVIEW MIRROR INCORPORATING A THIRD SURFACE METAL REFLECTOR AND A DISPLAY SIGNAL LIGHT," filed on May 14, 1999, by William L. Tonar et al., now U.S. Pat. No. 6,356,376, the entire disclosure of which is incorporated herein by reference. Insofar as the present invention may be used in combination with any known electrochromic mirror systems, such electrochromic mirror systems will not be described in detail.

Figure 2:
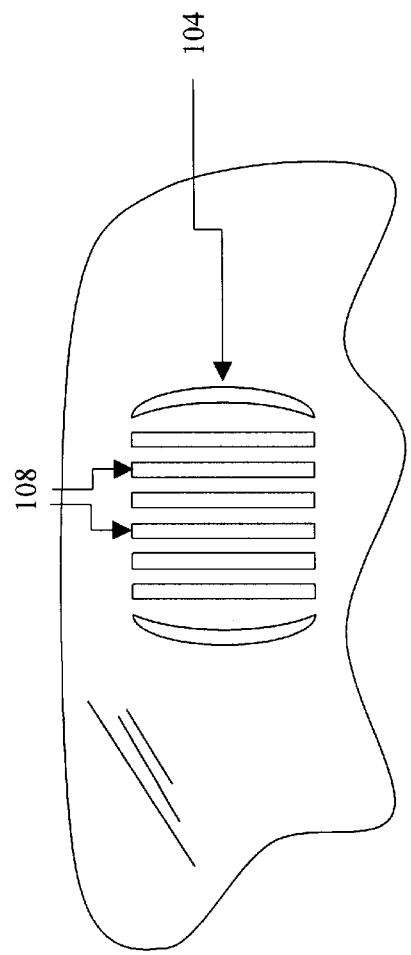
FIG. 2 is an enlarged partial perspective view, with portions broken away for clarity of illustration, of the rearview mirror assembly of FIG. 1.

FIG. 2 depicts window 104 as including a number of slots 108 devoid of reflective material. Creation of slots 108 allows a display to be visible through the reflective surface of mirror assembly 102. Slots 108 can be created in the reflective surface through a number of techniques, such as etching (laser, chemical or otherwise), masking during deposition, mechanical scraping or sand-blasting. These techniques are well known to those skilled in the art and as such are not further discussed herein. An example of an electrochromic mirror having such a display window is disclosed in commonly-assigned U.S. Pat. No. 5,825,527, by Jeffery Forgette et al., the disclosure of which is incorporated herein by reference.

Figure 3:
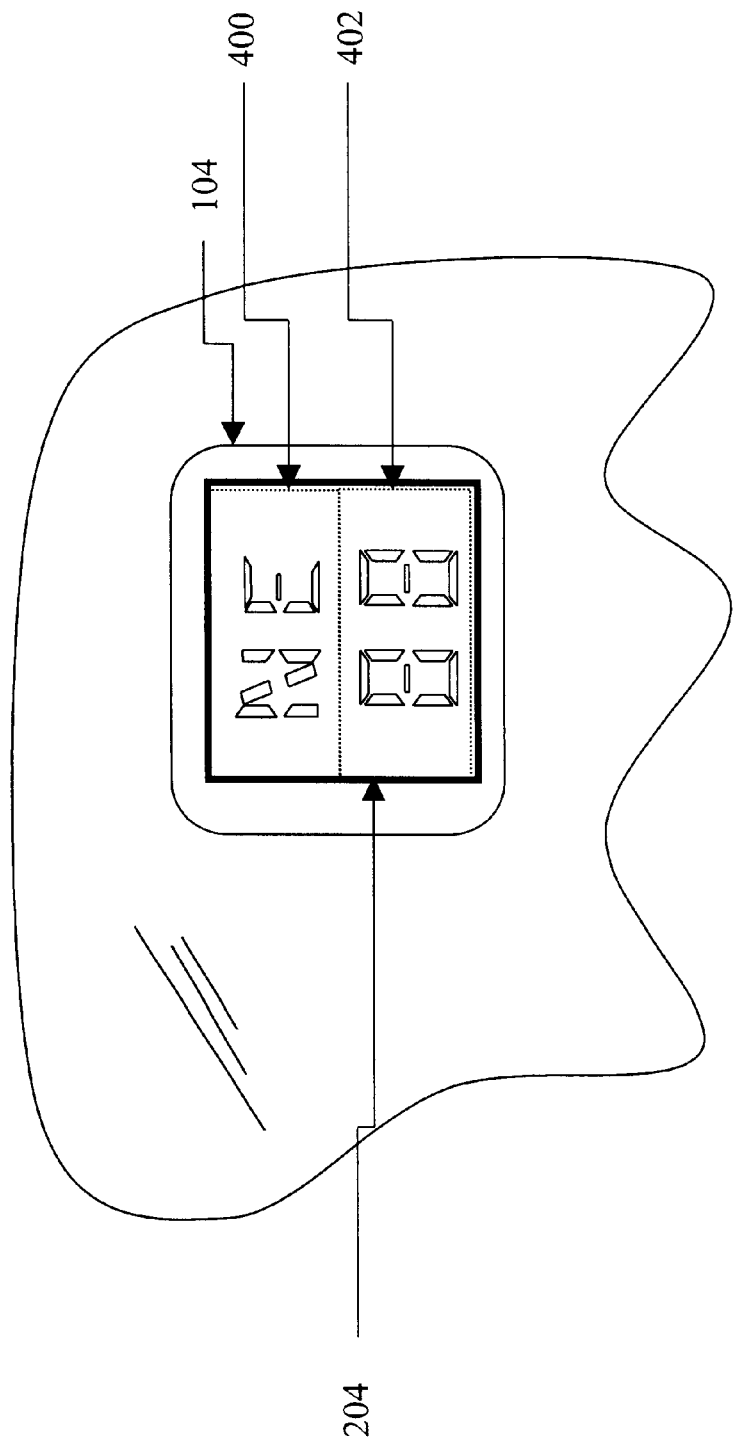
FIG. 3 is an enlarged partial perspective view, with portions broken away for clarity of illustration, of the rearview mirror assembly of FIG. 1 with a dual display visually providing both a vehicle direction and an external temperature.

FIG. 3 shows a dual display readout 204 simultaneously providing a vehicle heading and an external temperature through window 104 of mirror assembly 102. For purposes of example, vehicle heading display 400 indicates the vehicle is heading in a northeast direction while external temperature display 402 indicates that the external temperature is 88°. Thus, dual display readout 204 provides both a vehicle heading display 400 and an external temperature display 402 that are simultaneously visually discernable through window 104 of mirror assembly 102.

Figure 4:
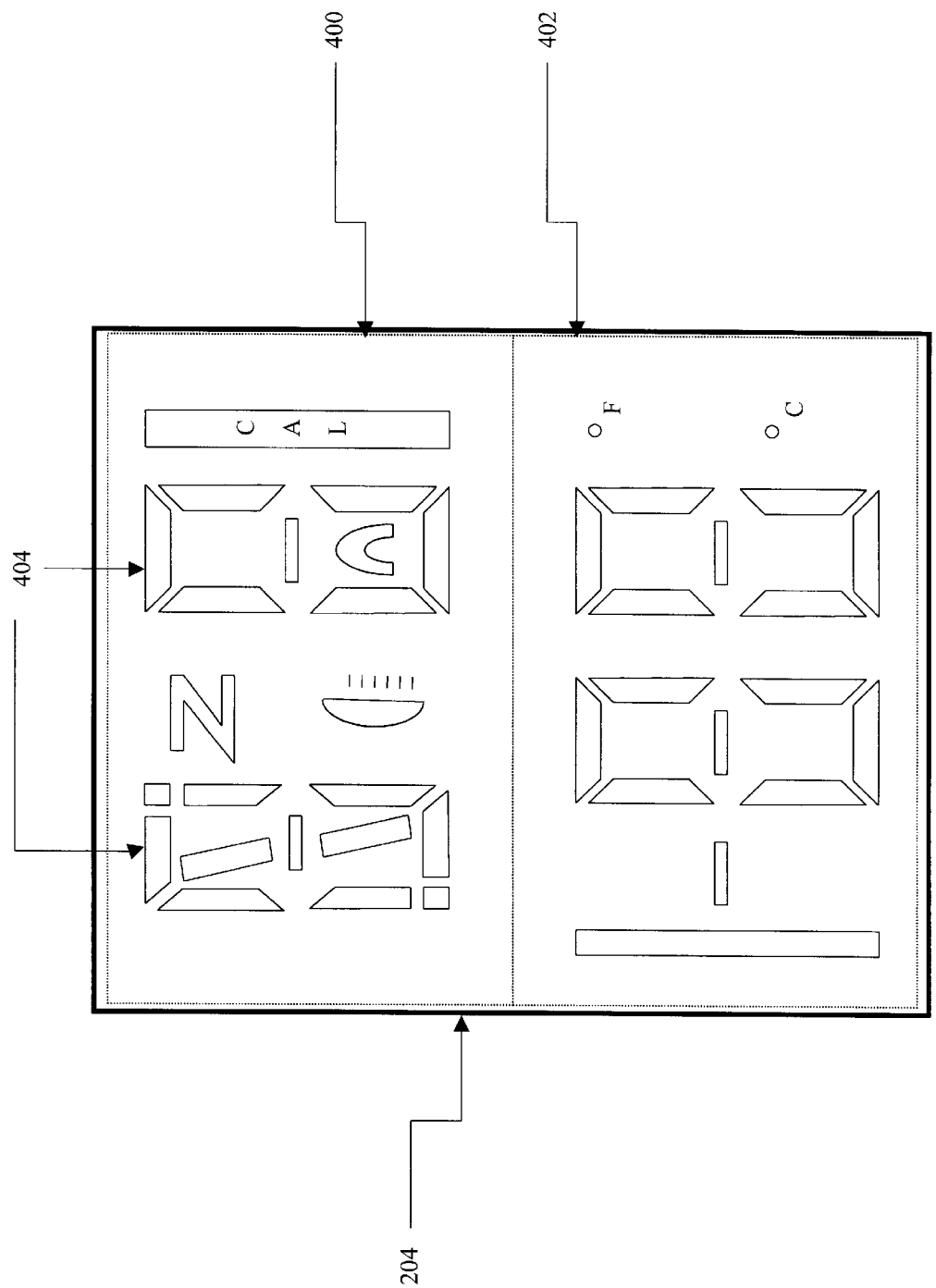
FIG. 4 is a perspective view of the front of a dual display.

FIG. 4 shows dual display readout 204 in more detail. Dual display readout 204 includes a vehicle heading display 400 and an external temperature display 402. Vehicle heading display 400 and external temperature display 402 are made up of various segments 404. In the disclosed embodiment, segments 404 are triode tubes that produce no illumination when grids (G1 and G2) are at approximately zero volts. Grids G1 and G2 are supplied with a voltage from lines 244 (see FIG. 5), which are coupled to the corresponding output ports Q1 and Q2 of dual display driver 200. When the grids are at approximately twelve volts, an applied plate voltage determines display intensity. Vehicle heading display 400 and external temperature display 402 are alternately updated by dual display driver 200. Dual display readout 204 is updated whenever the enable input of dual display driver 200 is asserted.

A pulse width modulated blanking signal is provided to dual display driver 200. In response to the blanking signal, dual display driver 200 controls the intensity of dual display readout 204. When an enable signal is asserted on an enable input of dual display driver 200, dual display driver 200 accepts serial data on a SDI (serial data in) line. The drive signals from dual display driver 200 are coupled to plate inputs (P1–P18) of dual display 202 by drive signal lines 242. The state of the drive signal lines 242 determines which of segments 404 of dual display readout 204 are active and the voltage level applied to plate inputs (P1–P18) determine the intensity of the illuminated segments.

The voltage level applied to plate inputs (P1–P18), is based upon the pulse width modulated blanking signal supplied to dual display driver 200. The blanking signal may correspond to the attenuation level of the transmissive element. In this manner, the intensity of the display may be increased as the transmittance of the transmissive element decreases thereby providing a display that is perceived by a vehicle occupant as having a constant intensity despite darkening of the mirror. An example of an electrochromic mirror having a display whose intensity is controlled in such a manner is disclosed in commonly-assigned U.S. Pat. No. 5,883,605, entitled, "AUTOMATIC ELECTROCHROMIC CONTROL OF LIGHT LEVEL OF VACUUM FLORESCENT DISPLAY," by Robert C. Knapp, the disclosure of which is incorporated herein by reference.

Figure 5:
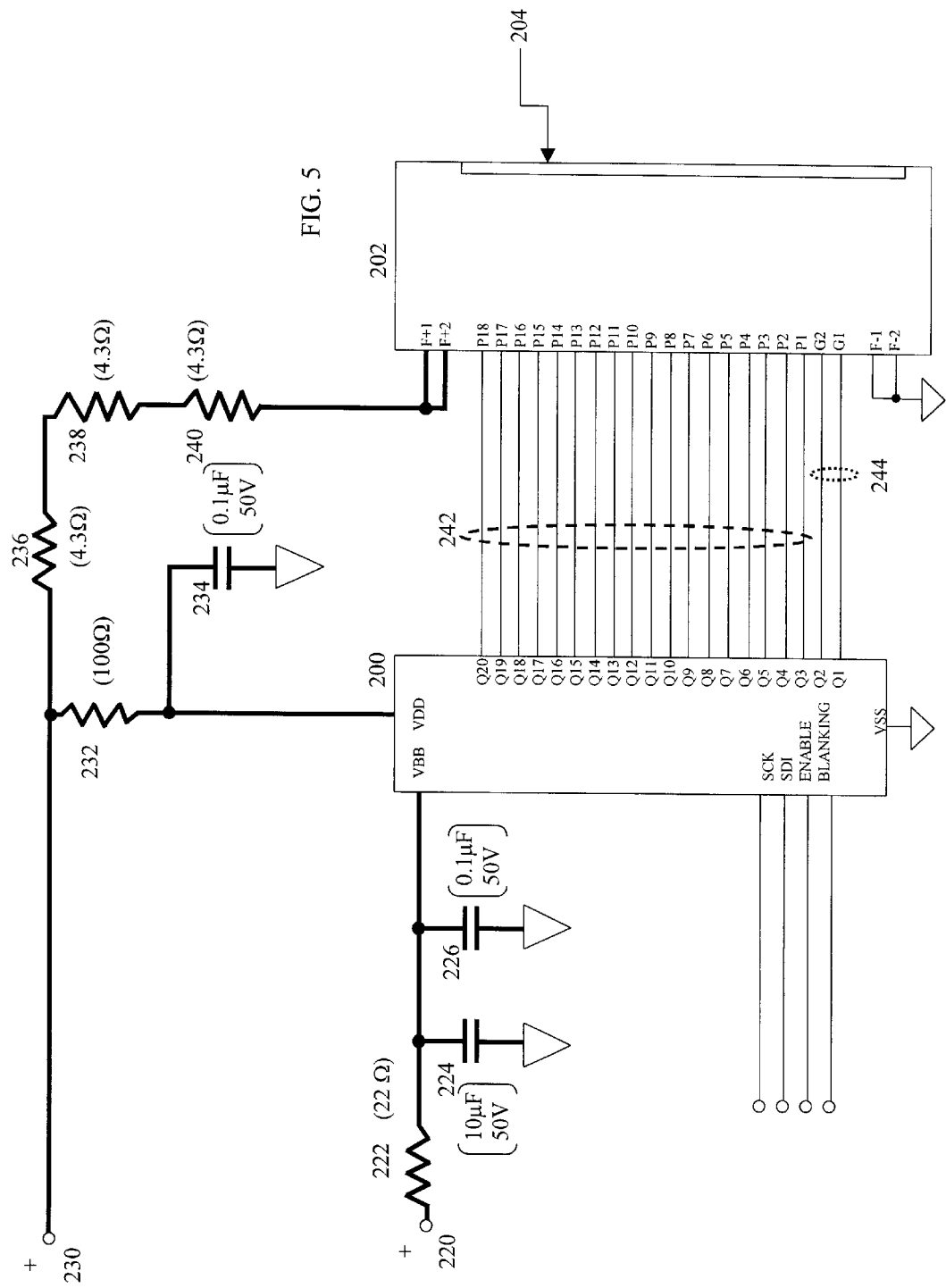
FIG. 5 is an electrical circuit diagram in schematic form of a dual display driver providing drive signals to a dual display.

Moving to FIG. 5, dual display driver 200 is shown coupled to dual display 202. In the disclosed embodiment, dual display driver 200 is preferably Part No. A6812ELW manufactured by Allegro MicroSystems, Inc., of Worchester, Mass. The disclosed dual display 202 is preferably Part No. 2-ST-119GN manufactured by Futaba Corp. of Japan. Dual display driver 200 drives dual display 202 such that the vehicle heading and external temperature are simultaneously displayed on a dual display readout 204. Dual display driver 200 alternates between updating the vehicle heading and the external temperature.

A power supply 220 (12 volts in the disclosed embodiment) supplies power to dual display driver 200 through an R-C (filter) network. The R-C network includes a resistor 222 and two capacitors 224 and 226. Resistor 222 in the disclosed embodiment is preferably a 22Ω resistor. Resistor 222 couples power supply 220 to a VBB input of dual display driver 200. Capacitor 224, in the disclosed embodiment, is preferably a 10 μF, 50V tantalum capacitor. Capacitor 226, in the disclosed embodiment, is preferably a 0.1 μF, 50V capacitor. Capacitors 224 and 226 are coupled between the VBB input of dual display driver 200 and ground.

A power supply 230 (5 volts in the disclosed embodiment) provides power to dual display driver 200 and to dual display 202 through another R-C (filter) network. A resistor 232 couples power supply 230 to a VDD input of dual display driver 200. A capacitor 234 is coupled between the VDD input of dual display driver 200 and ground. Resistors 236–240 are serially connected between power supply 230 and F+1 and F+2 inputs of dual display 202. In the disclosed embodiment, resistor 232 is preferably a 100Ω resistor and resistors 236–240 are preferably 4.3Ω resistors. Capacitor 234 is preferably a 0.1 μF, 50V capacitor. While power supply 230 is depicted as a separate power supply, the power it supplies typically would be derived from power supply 220.

Figure 6:
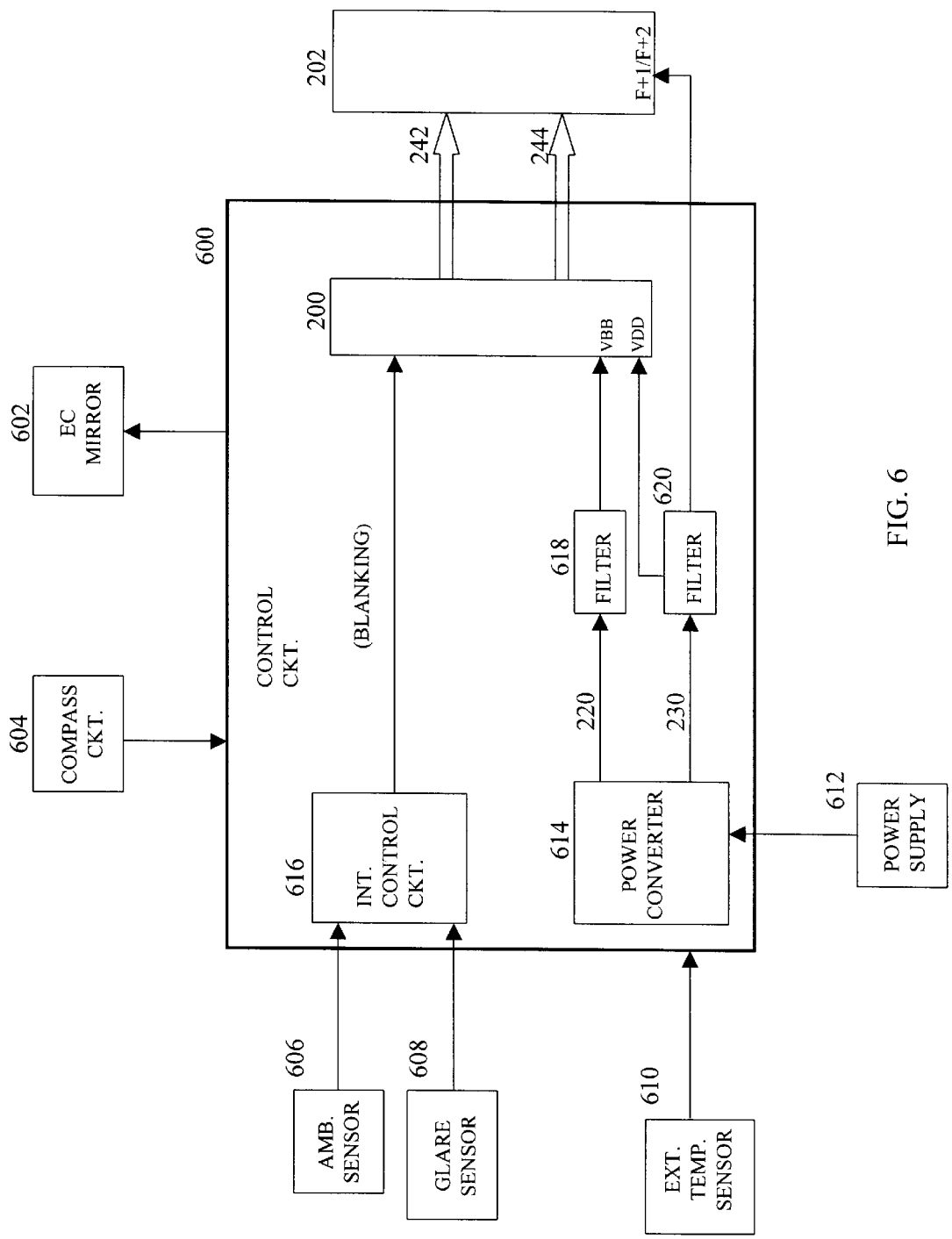
FIG. 6 is an electrical circuit diagram in block form of a control circuit receiving and providing various signals to a dual display.

Dual display driver 200 is clocked by a clock circuit (not shown). The clock circuit provides a clock signal with a frequency of approximately 70 kHz to a SCK (serial clock) input of dual display driver 200. Serial data is supplied to dual display driver 200 on a SDI (serial data in) input line at the clock signal frequency. When dual display 202 displays a vehicle heading and an external temperature, the vehicle heading is supplied by a compass circuit 604 (FIG. 6) and the external temperature is provided by a temperature sensor 610 (FIG. 6). Output signals from the temperature circuit and the compass circuit are provided to dual display driver 200 on the SDI input line. This is accomplished by multiplexing the output signals of the temperature and compass circuits. The multiplexing is performed under software control at a frequency of approximately 150 Hz. Multiplexing between the output signals of the temperature and compass circuits results in increased switching noise. The switching noise is reduced, to acceptable levels, by filtering the power supplies 220 and 230 as discussed above.

FIG. 6 shows a control circuit 600 providing and receiving various signals. Control circuit 600 provides a control signal to an electrochromic mirror 602 which determines the reflectivity of electrochromic mirror 602. Control circuit 600 receives signals from a compass circuit 604, an ambient sensor 606, a glare sensor 608, and an external temperature sensor 610. Power supply 612 provides power to control circuit 600 via power converter 614. Power converter 614 provides power supply 220 to dual display driver 200 via filter 618. Power converter 614 also provides power supply 230 to dual display driver 200 and dual display 202 via filter 620. Filter 618 is made-up of capacitors 224 and 226 and resistor 222 (see FIG. 5). Filter 620 is made-up of capacitor 234 and resistors 232 and 236–240 (see FIG. 5).

Intensity control circuit 616 receives signals from ambient sensor 606 and glare sensor 608. In response to these received signals, intensity control circuit 616 varies the reflectance of mirror 602 and provides a blanking signal to dual display driver 200. Dual display driver 200 provides plate signals on lines 242 and provides grid signals on lines 244 to dual display 202. As previously stated, dual display driver 200 adjusts the plate voltages that are supplied on lines 242 to dual display 202 in response to the blanking signal provided by intensity control circuit 616.

Figure 7:
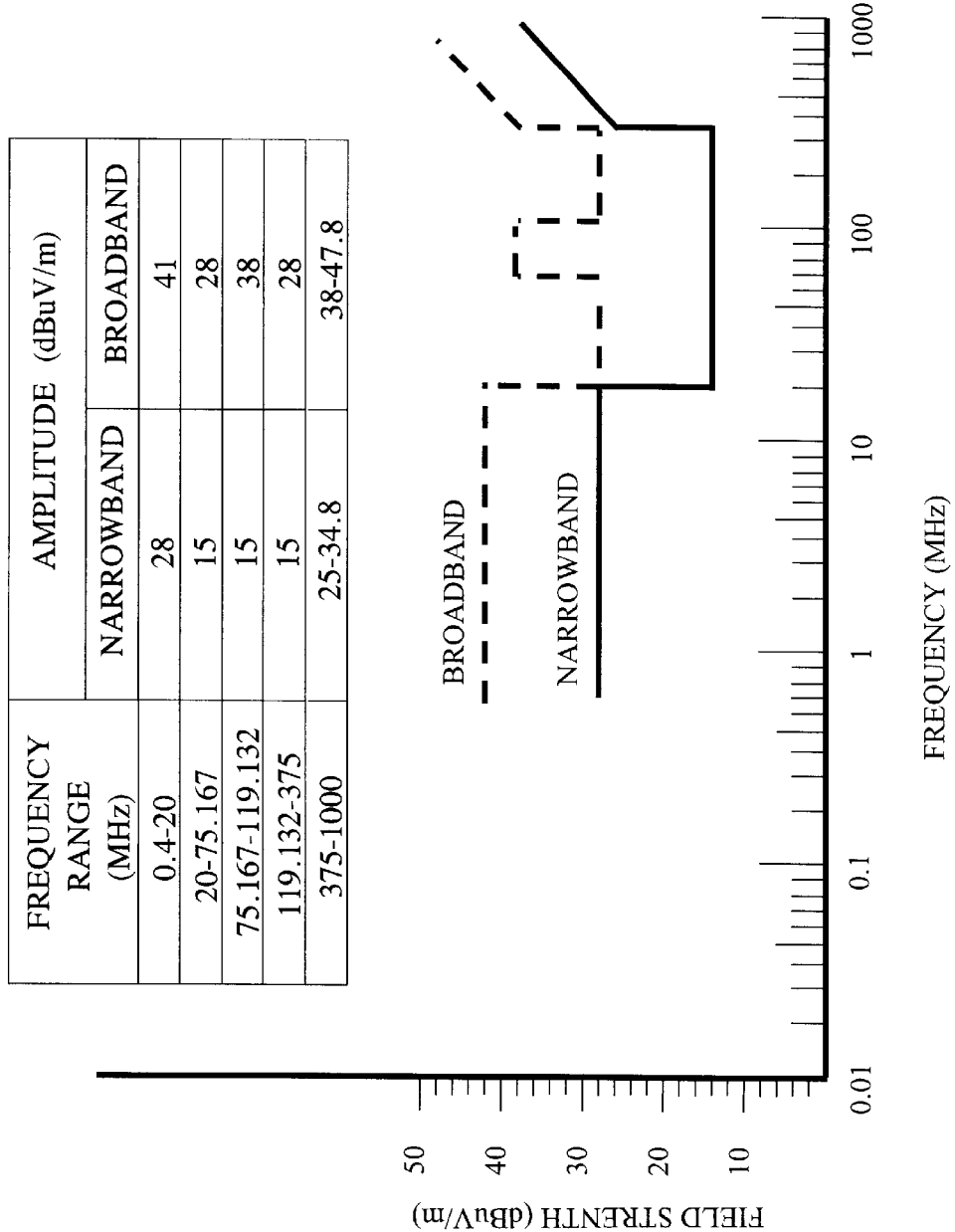
FIG. 7 graphically illustrates currently acceptable EMI levels for both narrowband and broadband emissions.

FIG. 7 graphically illustrates currently acceptable EMI levels for both narrowband and broadband emissions. In this context, broadband refers to a bandwidth which is greater than that of the receiver that is used to measure emissions. Conversely, narrowband refers to a bandwidth that is less than that of the receiver that is used to measure emissions. A typical EMI measurement receiver has a bandwidth of approximately 10 kHz. A typical broadband emission source includes ignition systems and brush type DC motors. A typical narrowband emission source includes microprocessors, clocks, pulse width modulated motor drivers and light dimmers and chopping type power supplies.

As illustrated in FIG. 7, from 0.4–20 MHz, narrowband emissions are limited to 28 dBuV/m and broadband emissions are limited to 41 dBuV/m. From 20–75.167 MHz, narrowband emissions should not exceed 15 dBuV/m and the broadband emissions should not exceed 28 dBuV/m. From 75.167–119.132 MHz narrowband emissions are limited to 15 dBuV/m and broadband emissions are limited to 38 dBuV/m. From 119.132–375 MHz, narrowband emissions should not exceed 15 dBuV/m and broadband emissions should not exceed 28 dBuV/m. In the range of 375–1000 MHz, narrowband and broadband limitations are approximately linear.

At 375 MHz, narrowband emissions should not exceed 25 dBuV/m and at 1000 MHz narrowband emissions should not exceed 34.8 dBuV/m. At 375 MHz, broadband emissions should not exceed 38 dBuV/m and at 1000 MHz broadband emissions should not exceed 47.8 dBuV/m. Of particular interest in this case is the frequency range from 0.4–20 MHz. As previously stated, in this frequency range narrowband emissions should be less than about 28 dBuV/m and broadband emissions should be less than about 41 dBuV/m.

Figure 8:
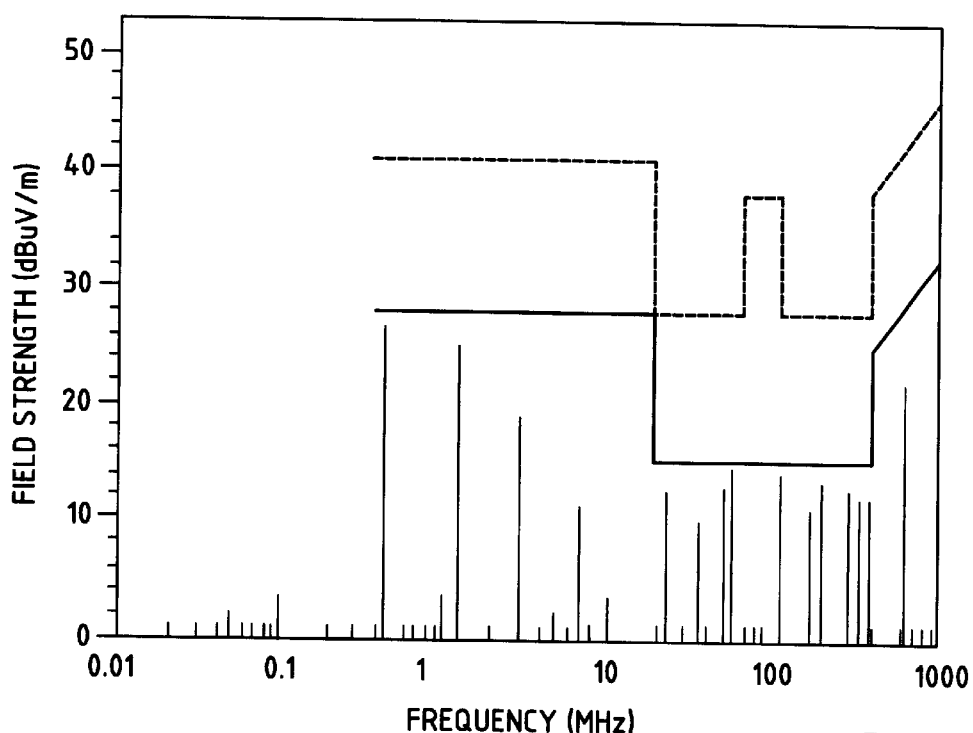
FIG. 8 graphically depicts a typical narrowband EMI emission spectrum.

FIG. 8 illustrates a typical narrowband emission spectrum. The illustrated narrowband emission spectrum is within the narrowband emission limits of FIG. 7. As stated above, a typical narrowband emission source includes microprocessors, clocks, pulse width modulated motor drivers and light dimmers and chopping type power supplies. The narrowband emission spectrum, of FIG. 8, is provided for illustration only and is not intended to be limiting. One skilled in the art will appreciate that narrowband emission spectrums depend on the characteristics of a given circuit or device.

Figure 9:
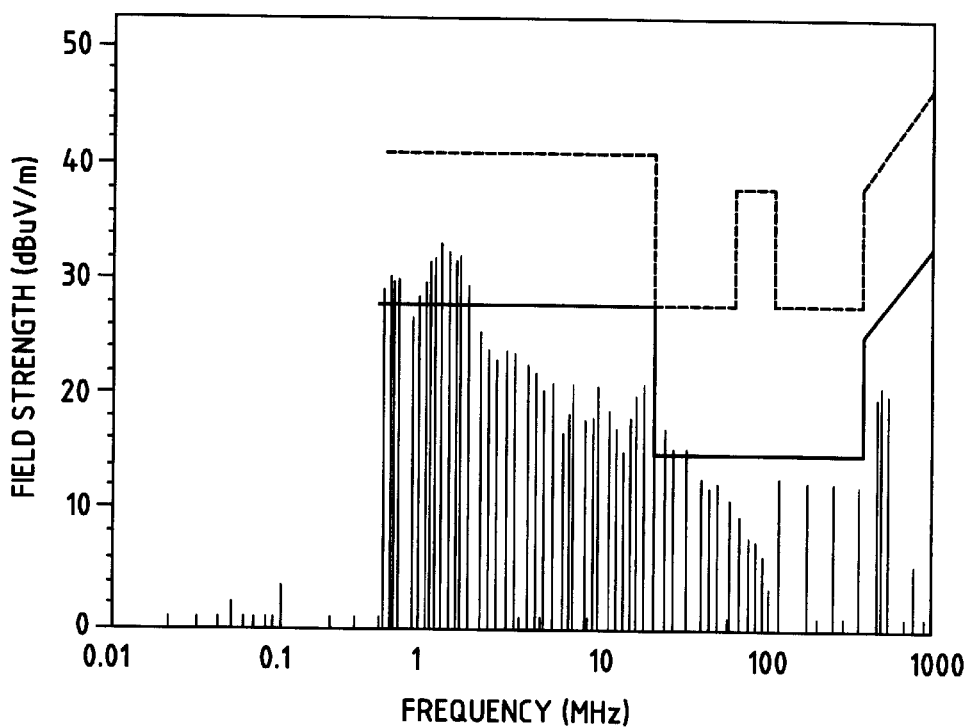
FIG. 9 graphically depicts a typical broadband EMI emission spectrum.

FIG. 9 graphically depicts a typical broadband emission spectrum. The broadband emission spectrum, of FIG. 9, is within the broadband emission limits as set forth in FIG. 7. As previously stated, a typical broadband emission source includes ignition systems and brush type DC motors. The illustrated broadband emission spectrum is only provided as an example and is not intended to be limiting. One skilled in the art will appreciate that broadband emission spectrums also depend on the characteristics of a given circuit or device.

The above description is considered that of the preferred embodiment only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A mirror assembly having an electrically adjustable reflectivity and providing for the simultaneous display of information, the mirror assembly comprising:

a mounting structure;

a reflective device attached to the mounting structure, wherein the reflective device includes a transmissive element and a reflective surface formed on the transmissive element;

a multiple element display for visually providing the information attached to the mounting structure; and a control circuit which provides for the variable attenuation of light through the transmissive element and controls the intensity and the information displayed by the multiple element display, the control circuit sequentially providing the information to the multiple element display, the control circuit exhibiting an electromagnetic interference level less than about 41 dBuV/m for emissions in the frequency range from about 0.4 MHz to about 20 MHz.

2. The mirror assembly of claim 1, wherein the control circuit further includes:

a first power supply filter coupled between a first power supply and a multiple element display driver; and a second power supply filter coupled between a second power supply and the multiple element display, and wherein the first and second power supply filters function to reduce the electromagnetic interference level exhibited by the control circuit.

3. The mirror assembly of claim 2, wherein the second power supply is derived from the first power supply.

4. The mirror assembly of claim 1, wherein the control circuit further includes:

a light sensor which senses ambient and glare light levels;

a multiple element display driver which provides information signals to the multiple element display; and an intensity circuit which adjusts the reflectivity of the reflective device and intensity of the multiple element display responsive to the light sensor.

5. The mirror assembly of claim 4, wherein the electromagnetic interference level exhibited by the control circuit is less than about 28 dBuV/m for narrowband emissions in the frequency range from about 0.4 MHz to about 20 MHz.

6. The mirror assembly of claim 1, wherein the information includes a vehicle heading and an external temperature.

7. The mirror assembly of claim 1, wherein the reflectivity of the reflective device is adjusted based on an ambient light level.

8. The mirror assembly of claim 1, wherein the reflectivity of the reflective device is adjusted based on a glare light level.

9. The mirror assembly of claim 1, where the reflectivity of the reflective device is adjusted based on both an ambient light level and a glare light level.

10. The mirror assembly of claim 1, wherein the intensity of the multiple element display is adjusted based on an ambient light level.

11. The mirror assembly of claim 1, wherein the intensity of the multiple element display is adjusted based on a glare light level.

12. The mirror assembly of claim 1, where the intensity of the multiple element display is adjusted based on both an ambient light level and a glare light level.

13. The mirror assembly of claim 1, wherein the reflective surface includes a window opening through which the multiple element display is visible.

14. The mirror assembly of claim 1, wherein the reflective surface includes a window opening in which the reflective surface is partially removed such that the multiple element display is visible.

15. The mirror assembly of claim 1, wherein the transmissive element includes an electrochromic medium.

16. The mirror assembly of claim 1, wherein the multiple element display is a vacuum fluorescent display.

17. A mirror assembly having an electrically adjustable reflectivity and providing for the simultaneous display of information; the mirror assembly comprising:

a mounting structure;

a reflective device attached to the mounting structure, wherein the reflective device includes a transmissive element and a reflective surface formed on the transmissive element;

a multiple element display for visually providing the information attached to the mounting structure; and a control circuit which provides for the variable attenuation of light through the transmissive element and controls the intensity and the information displayed by the multiple element display, the control circuit sequentially providing the information to the multiple element display, the control circuit exhibiting an electromagnetic interference level less than about 28 dBuV/m for narrowband emissions in the frequency range from about 0.4 MHz to about 20 MHz.

18. The mirror assembly of claim 17, wherein the multiple element display is located behind the reflective surface of the reflective device and visually provides the information through a window opening in the reflective surface of the reflective device.

19. The mirror assembly of claim 17, wherein the control circuit exhibits an electromagnetic interference level less than about 15 dBuV/m for narrowband emissions in the frequency range from about 20 MHz to about 375 MHz.

20. The mirror assembly of claim 17, wherein the control circuit exhibits an electromagnetic interference level less than about 41 dBuV/m for broadband emissions in the frequency range from about 0.4 MHz to about 20 MHz.

21. The mirror assembly of claim 17, wherein the control circuit exhibits an electromagnetic interference level less than about 28 dBuV/m for broadband emissions in the frequency range from about 20 MHz to about 75.167 MHz.

22. The mirror assembly of claim 17, wherein the control circuit exhibits an electromagnetic interference level less than about 38 dBuV/m for broadband emissions in the frequency range from about 75.167 MHz to about 119.132 MHz.

23. The mirror assembly of claim 17, wherein the control circuit exhibits an electromagnetic interference level less than about 28 dBuV/m for broadband emissions in the frequency range from about 119.132 MHz to about 375 MHz.

24. The mirror assembly of claim 17, wherein the information includes a vehicle heading and an external temperature.

25. A mirror assembly having an electrically adjustable reflectivity and providing for the simultaneous display of information, the mirror assembly comprising:

a mounting structure;

a reflective device attached to the mounting structure, wherein the reflective device includes a transmissive element and a reflective surface formed on the transmissive element;

a multiple element display for visually providing the information attached to the mounting structure; and a control circuit which provides for the variable attenuation of light through the transmissive element and controls the intensity and the information displayed by the multiple element display, the control circuit sequentially providing the information to the multiple element display, the control circuit exhibiting an electromagnetic interference level less than about 41 dBuV/m for broadband emissions in the frequency range from about 0.4 MHz to about 20 MHz and an electromagnetic interference level less than about 15 dBuV/m for narrowband emissions in the frequency range from about 0.4 MHz to about 20 MHz.

26. The mirror assembly of claim 25, wherein the multiple element display is located behind the reflective surface of the reflective device and visually provides the information through a window opening in the reflective surface of the reflective device.

27. The mirror assembly of claim 25, wherein the information includes a vehicle heading and an external temperature.

* * * * *